(12) United States Patent
Vollmer

(10) Patent No.: US 7,705,507 B2
(45) Date of Patent: Apr. 27, 2010

(54) ELECTRICAL MACHINE HAVING A THREE-PHASE WINDING SYSTEM

(75) Inventor: Rolf Vollmer, Gersfeld (DE)

(73) Assignee: Siemens Aktiengesellschaft, Munich (DE)

( * ) Notice: Subject to any disclaimer, the term of this patent is extended or adjusted under 35 U.S.C. 154(b) by 276 days.

(21) Appl. No.: 11/995,768

(22) PCT Filed: Jan. 10, 2007

(86) PCT No.: PCT/EP2007/050210

§ 371 (c)(1),
(2), (4) Date: Jan. 15, 2008

(87) PCT Pub. No.: WO2007/085527

PCT Pub. Date: Aug. 2, 2007

(65) Prior Publication Data
US 2008/0197742 A1 Aug. 21, 2008

(30) Foreign Application Priority Data
Jan. 20, 2006 (DE) ........................ 10 2006 002 900

(51) Int. Cl.
*H02K 3/28* (2006.01)
*H02K 3/48* (2006.01)
(52) U.S. Cl. ...................... 310/198; 310/184
(58) Field of Classification Search ......... 310/179–180, 310/184, 198, 206, 207, 208; 242/433
See application file for complete search history.

(56) References Cited
U.S. PATENT DOCUMENTS
4,619,040 A 10/1986 Wang et al.

| 5,376,852 | A | * | 12/1994 | Kawamura et al. | 310/198 |
| 5,898,251 | A | * | 4/1999 | Mochizuki et al. | 310/179 |
| 6,114,790 | A | * | 9/2000 | Fei | 310/180 |
| 6,455,972 | B1 | * | 9/2002 | Asao et al. | 310/184 |

FOREIGN PATENT DOCUMENTS

| JP | 57022359 A | 5/1982 |
| JP | 57183242 A | * 11/1982 |
| JP | 60200.738 A | 11/1985 |

* cited by examiner

*Primary Examiner*—Tran N Nguyen
(74) *Attorney, Agent, or Firm*—Henry M. Feiereisen; Ursula B. Day

(57) ABSTRACT

The electrical machine has a stator, which comprises thirty-six slots and thirty-six teeth with an alternating sequence and a winding system (10) which is arranged at least partially in the slots and has three winding phases (34, 35, 36). The winding system (10) contains in total eighteen coil elements (11-28), which are laid in each case two slots, with the result that a slot associated with another of the coil elements (11, 12, 16, 17, 18, 22, 23, 24, 28) is located between the two slots associated with one of the coil elements (13, 14, 15, 19, 20, 21, 25, 26, 27). In each case two of the coil elements (11-28) form one of nine interwound groups of coil elements (29), wherein, of the four adjacent slots belonging to a group of coil elements (29), the first and the third slot are associated with one coil element (13, 14, 15, 19, 20, 21, 25, 26, 27), and the second and the fourth slot are associated with the other coil element (11, 12, 16, 17, 18, 22, 23, 24, 28) in this group of coil elements (29). The two coil elements (11-28) of each group of coil elements (29) are associated with in each case two different winding phases (34, 35, 36). In each case one substantially unwound tooth (30) is provided between two adjacent groups of coil elements (29).

7 Claims, 2 Drawing Sheets

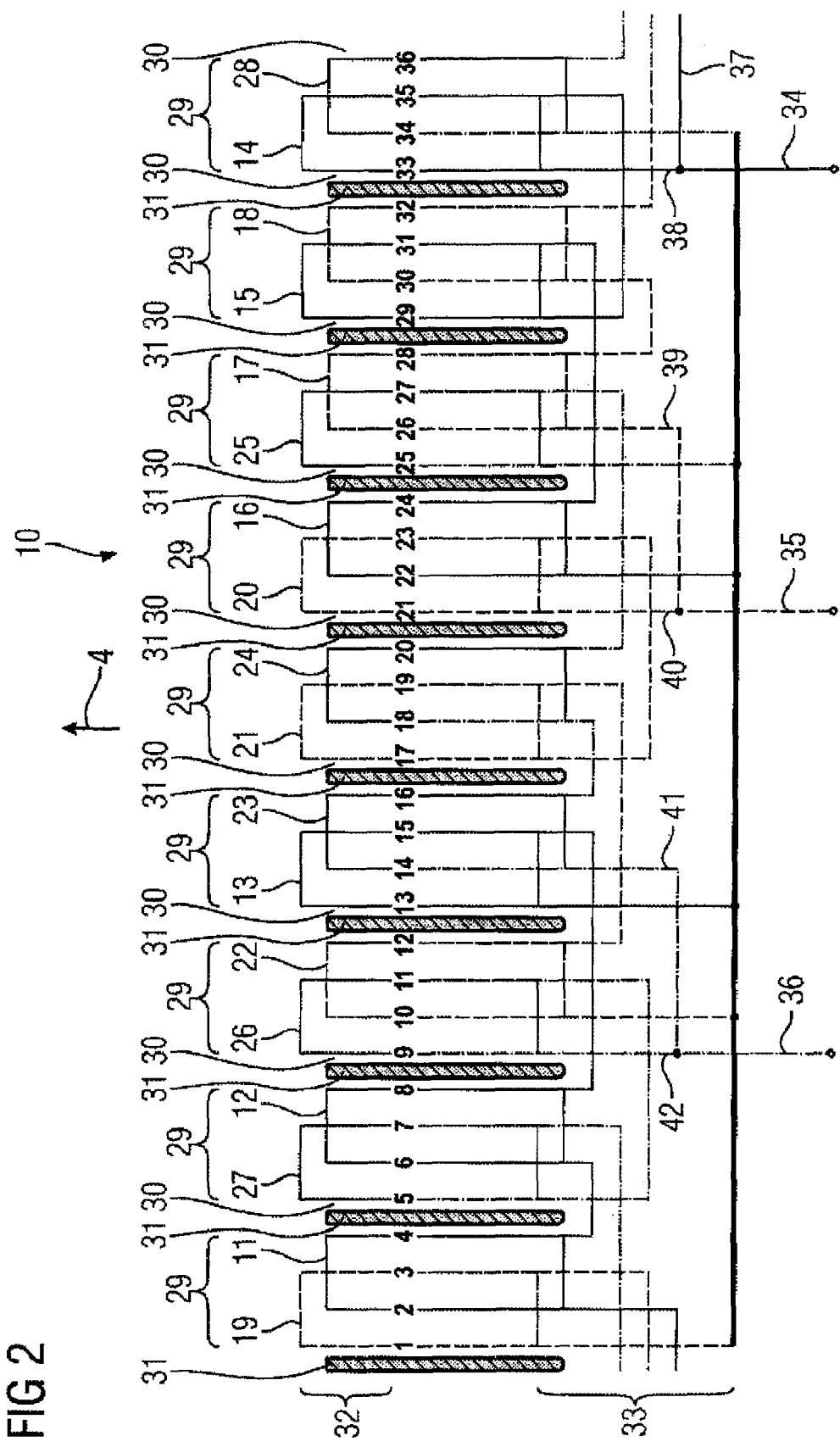

ELECTRICAL MACHINE HAVING A THREE-PHASE WINDING SYSTEM

BACKGROUND OF THE INVENTION

The invention relates to an electrical machine having a stator which has thirty six slots and thirty six teeth in an alternating sequence, as well as a winding system which is at least partially arranged in the slots and has three winding phases.

At the moment, two different embodiments essentially exist for an electrical machine such as this which, in particular, is in the form of a synchronous machine with permanent-magnet excitation, and these embodiments differ from one another in the configuration of their respective winding system.

In the first embodiment, the winding elements of the three winding phases are completely interleaved in one another. For example, that is to say, three successive slots are filled with electrical conductors which in each case belong to another of the three winding phases. In a corresponding manner, in the case of an embodiment with twelve slots, the first winding element of the first winding phase would run in the first and the fourth slots, the first winding element of the second winding phase would run in the second and the fifth slots, and the first winding element of the third winding phase would run in the third and the sixth slots. The slot occupancy of the second winding elements, which are connected in series with the respective first winding elements, result from those of the first winding elements by addition of six slot positions in each case. This winding system has four poles, that is to say two useful pole pairs, so that the ratio of the number of slots (=12) to the number of poles (=4) assumes the value 3. This is a typical minimum value for first embodiments. In an alternative first embodiment, forty eight slots are provided and sixteen poles, once again resulting in a ratio value of 3.

In the second embodiment, the winding elements of the three winding phases—apart from circuitry in the area of the end windings—are completely separated from one another. So-called tooth-wound coils are used as winding elements and, in particular, are each inserted into two adjacent slots and surround the tooth located between the two adjacent slots. In this case, electrical conductors on two different tooth-wound coils may be arranged in one slot. In a corresponding manner, in the case of a configuration with six slots, the first tooth-wound coil of the first winding phase would run in the first and the second slots, the first tooth-wound coil of the second winding phase would run in the second and the third slots, and the first tooth-wound coil of the third winding phase would run in the third and fourth slots. The slot occupancy of the second tooth-wound coils connected in series with respect to the respective first tooth-wound coil results from that of the first tooth-wound coils by addition of three slot positions in each case. This winding system also has a total of four poles, so that the ratio of the number of slots (=6) to the number of poles (=4) assumes the value 1.5. This is a typical maximum value for second embodiments. In an alternative second embodiment, the number of slots provided is twenty four, and the number of poles is sixteen, once again resulting in a ratio value of 1.5.

An electrical machine according to the first embodiment has a relatively large end winding area, whereas, in contrast, the second embodiment leads to a comparatively small overall slot area.

The object of the invention is therefore to specify an electrical machine of the type referred to initially whose response is better than that of the known prior art.

SUMMARY OF THE INVENTION

This object is achieved in accordance with the invention by an electrical machine which includes a) the winding system contains a total of eighteen coil elements which are each laid in two slots such that a slot which is associated with a different one of the coil elements is located between the two slots which are associated with one of the coil elements, b) two of the coil elements in each case form one of nine interleaved coil element groups, with the first and the third slot of the four adjacent slots which are associated with one coil element group being associated with the first coil element and with the second and the fourth slots being associated with the other coil element in this coil element group, c) the two coil elements in each coil element group are each associated with two different winding phases, and d) a fundamentally unwound tooth is placed between two adjacent coil element groups.

The electrical machine according to the invention has a partially interleaved winding system in which, in particular, a winding step 1-3 is provided. This is a highly advantageous intermediate form between the known embodiments with the completely interleaved winding system and with the tooth-wound coil winding system. Its ratio of the number of slots to the number of poles is between that of the known embodiments. The electrical machine according to the invention allows the end winding height to be relatively low since only two winding phases are interleaved in one another in each case, rather than all three. Furthermore, it has a high winding factor of, in particular, more than 0.85. With a comparable number of poles, the electrical machine according to the invention has a larger overall area of all the slots than an electrical machine with a tooth-wound coil winding system. This is advantageous for dissipation of the heat which results from the copper losses in the electrical conductors in the winding system.

In one advantageous variant, a supply or cooling channel is arranged within the unwound teeth. This allows the electrical machine to be provided with an additional functionality. In particular, the cooling can be improved in this way. The unwound teeth in the area of the end windings are essentially freely accessible, so that said channels can in this case be connected very well.

Furthermore, the number of poles provided may be in the range between fourteen and twenty two, in particular between sixteen and twenty. The electrical machine then has a particularly high winding factor, for example of about 0.945. The complete range of the numbers of poles is therefore covered very well in the given stator laminate section with the thirty six slots. Thus, in particular, a completely interleaved winding system can be provided if the number of required poles is between two and twelve, the partially interleaved winding system according to the invention can be provided in a preferred manner if the required number of poles is between fourteen and twenty two, and a tooth-wound coil winding system can advantageously be provided if the required number of poles is at least twenty four. In consequence, the response of the electrical machine can be designed very differently depending on the winding system used, but with the stator laminate section in each case being the same.

The electrical machine is preferably a machine in permanent magnet excitation, in which a rotor equipped with permanent magnets is provided. Machines with permanent magnet excitation, in particular synchronous machines with permanent magnet excitation such as synchronous motors, are nowadays often mass-produced products for whose manufacture a certain amount of flexibility in terms of component usage capability is particularly important. Existing stator laminate sections from other machines can be used, in a preferred manner, for the electrical machine according to the invention.

In another advantageous variant, a rotor in the form of an external rotor or of an internal rotor is provided. The advantageous winding system described above can be used with the stated advantages in both embodiments.

BRIEF DESCRIPTION OF THE DRAWING

Further features, advantages and details of the invention will become evident from the following description of the exemplary embodiments, and with reference to the drawing, in which, FIG. 2 shows one exemplary embodiment of a winding scheme for the electrical machine shown in FIG. 1.

DETAILED DESCRIPTION OF PREFERRED EMBODIMENTS

Figure 1:
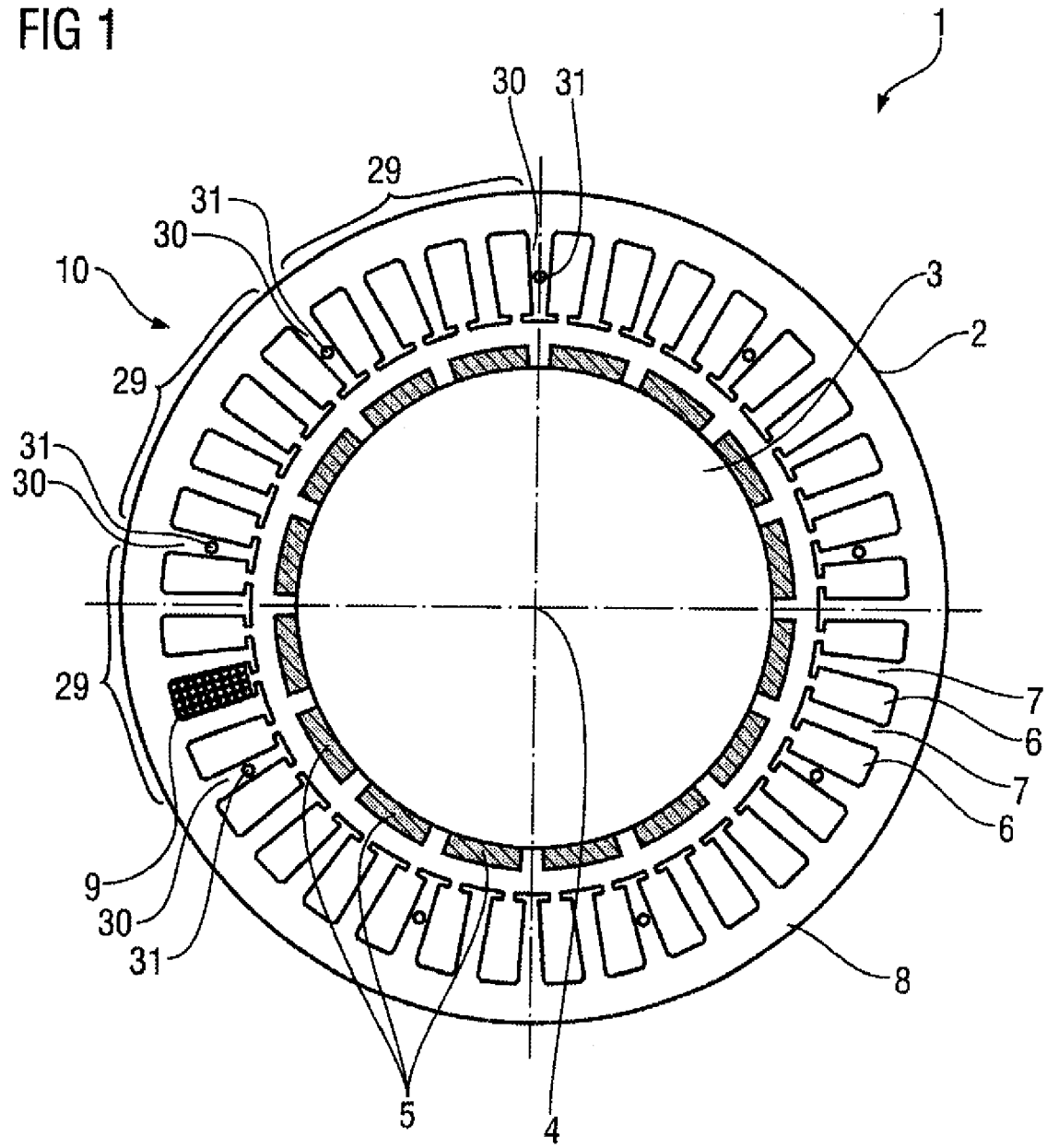
FIG. 1 shows one embodiment of an electrical machine having a partially interleaved winding system, in the form of a cross-sectional illustration.

Mutually corresponding parts are provided with the same reference symbols in FIGS. 1 and 2.

FIG. 1 shows an exemplary embodiment of an electrical machine 1, in the form of a cross-sectional illustration. This is in the form of a synchronous motor with permanent magnet excitation and contains a stator 2 as well as a rotor 3, which is mounted such that it can rotate about a rotation axis 4. The rotor 3 is an internal rotor which, in the exemplary embodiment, is provided with a total of sixteen permanent magnets 5 distributed uniformly over the circumference. On its inner wall facing the rotor 3, the stator 2 contains a plurality of slots 6, a total of thirty six in the exemplary embodiment shown in FIG. 1, distributed uniformly over the circumference, between each of which slots 6 a tooth 7 is arranged. These are connected to one another by an externally circumferential yoke 8. Electrical conductors 9 of a three-phase winding system 10 run within the slots 6. The winding system 10 has the comparatively large number of useful poles of sixteen. The ratio of the numbers of slots to poles is 2.25.

Owing to the large number of poles, the magnetic field induced in the teeth 7 is low. In consequence the yoke 8 can also be designed to be relatively narrow, that is to say with a small radial extent. Nevertheless, this does not lead to any adverse effect on magnetic flux guidance. Overall, this results in a compact form of low weight.

Details of the winding system 10 are illustrated in the simplified winding scheme shown in FIG. 2. As can be seen, the winding system 10 is formed by eighteen coil elements 11 to 28. Each of the coil elements 11 to 28 is wound with a so-called winding step 1-3. This means that in each case one further one of the slots 6 is arranged between the two slots 6 in which the electrical conductors 9 of one of the coil elements 11 to 28 run.

Two of the coil elements 11 to 28 in each case form one of nine interleaved coil element groups 29. Of the four adjacent slots which are associated with one coil element group 29, the first and the third slots are associated with the first coil element 13, 14, 15, 19, 20, 21, 25, 26 or 27, and the second and the fourth slots are associated with the other coil element 11, 12, 16, 17, 18, 22, 23, 24 or 28 of the respective coil element group 29.

One essentially unwound tooth 30 is in each case provided between two adjacent coil element groups 29. A tubular cooling channel 31 runs in each of these unwound teeth 30 and is produced, for example, by means of a longitudinal hole in the direction of the rotation axis 4. The cooling channels 31 are connected or diverted in a manner which is not shown in any more detail in the area of the end windings 32 and 33. The cooling channels 31 are not obligatory. They may also be omitted. In alternative exemplary embodiments which are not illustrated, it is also possible to provide differently designed supply channels, instead of them.

As indicated in FIG. 2, an area for the respective end windings 32 or 33 is provided in the axial direction, that is to say in the direction of the rotation axis 4, on both end faces of the actual active part of the stator 2. While the conductors 9 of the coil element windings turns till it just changes direction in the area of the end windings 32, the coil elements 11 to 28 are also electrically interconnected in the area of the end windings 33.

The winding system 10 has three phases. It therefore comprises three winding phases 34, 35, 36. In FIG. 2, the first winding phase 34 is represented by solid lines, the second winding phase 35 by dashed lines, and the third winding phase 36 by dashed-dotted lines.

The first coil element 13, 14, 15, 19, 20, 21, 25, 26 or 27 and the other coil element 11, 12, 16, 17, 18, 22, 23, 24 or 28 of each coil element group 29 are in each case associated with two different ones of the three winding phases 34, 35 and 36.

Each of the winding phases 34, 35 and 36 is composed of two parallel-connected winding element phases 37 and 38, 39 and 40, as well as 41 and 42, respectively. The winding element phases 37 to 42 each comprise three of the coil elements 11 to 28 connected in series.

Based on the sequential numbering of the slots 6 that is additionally shown in FIG. 2, the design of the winding system 10 is as follows:

The first winding element phase 37 of the first winding phase 34 is associated with the second and the fourth slot for the first coil element 11, the sixth and the eighth slot for the second coil element 12, and the fifteenth and the thirteenth slot for the third coil element 13.

The second winding element phase 38 of the first winding phase 34 is associated with the thirty third and the thirty fifth slot for the fourth coil element 14, the twenty ninth and the thirty first slot for the fifth coil element 15, and the twenty fourth and the twenty second slot for the sixth coil element 16.

In this case, the first, second and sixth coil elements 11, 12 and 16 respectively, have the same first winding sense. The third, fourth and fifth coil elements 13, 14 and 15, respectively, are wound in the opposite sense. They therefore have the same second winding sense, but this is opposite to the first winding sense.

The slot occupancies of the second and third winding phase 35 and 36, respectively, are provided, in comparison to the slot occupancy of the first winding phase 34, by Modulo-36 shifting by twenty four or twelve slot positions. This corresponds to a mechanical shift through 240° or 120° respectively.

The winding system 10 which results from this is partially interleaved, overall. This results in a completely interleaved winding system, that is to say a winding system with three interleaved phases, and an uninterleaved tooth-wound coil winding system between the known embodiments.

The end windings 32 and 33 of the electrical machine 1 have a low height, and the electrical machine 1 has a high winding factor of about 0.945. In addition, this results in very good heat dissipation because of the large total area of all the slots 6 facing the inner wall, and because of the optional cooling channels 31. The compact form and the light weight are also advantageous. Furthermore, it is advantageously possible to make use of the existing stator laminate sections of other electrical machines. This increases the flexibility and avoids new costly investment.

What is claimed is:

1. An electrical machine, comprising:
    a stator having thirty six slots and thirty six teeth arranged in an alternating sequence;
    a winding system at least partially arranged in the slots and having three winding phases and a total of eighteen coil elements arranged in pairs forming nine interleaved coil element groups which are separated by a tooth without a winding, with each coil element group having four adjacent slots, wherein in each coil element group a first and a third slot of the four adjacent slots is associated with a first of the coil elements and a second and a fourth slot of the four adjacent slots is associated with a second of the coil elements, and
    wherein the first and the second coil element in each coil element group are associated with different winding phases.

2. The electrical machine of claim 1, further comprising a supply channel or cooling channel arranged inside the teeth without a winding.

3. The electrical machine of claim 1, further comprising a rotor having a plurality of poles and configured for rotation relative to the stator.

4. The electrical machine of claim 3, wherein the plurality of poles include between fourteen and twenty two poles.

5. The electrical machine of claim 3, wherein the plurality of poles include between sixteen and twenty poles.

6. The electrical machine of claim 3, wherein the poles comprise permanent magnets.

7. The electrical machine of claim 1, wherein each winding phase comprises two partial winding phases which are connected in parallel and have each three coil elements connected in series,
    wherein in the first winding phase, a first of the three coil elements of the first partial winding phase is associated with the second and the fourth slot, a second of the three coil elements of the first partial winding phase is associated with the sixth and the eighth slot, and a third of the three coil elements of the first partial winding phase is associated with the fifteenth and the thirteenth slot, and a first of the three coil elements of the second partial winding phase is associated with the thirty third and the thirty fifth slot, a second of the three coil elements of the second partial winding phase is associated with the twenty ninth and the thirty first slot, and a third of the three coil elements of the second partial winding phase is associated with the twenty fourth and the twenty second slot, and
    wherein the first and second of the three coil elements of the first partial winding phase and third of the three coil elements of the second partial winding phase have an identical first winding sense, and the third of the three coil elements of the first partial winding phase and the first and second of the three coil elements of the second partial winding phase have an identical second winding sense opposite to the first winding sense, and
    wherein a slot occupancy of a second of the three winding phases is shifted relative to a slot occupancy of a first of the three winding phases by twenty four slot positions (modulo 36) and a third of the three winding phases is shifted relative to the slot occupancy of the first of the three winding phases by twelve slot positions (modulo 36).

* * * * *